(12) United States Patent
Schroderus et al.

(10) Patent No.: US 6,546,000 B1
(45) Date of Patent: Apr. 8, 2003

(54) METHOD FOR CHANNEL USE IN TDMA SYSTEM, AND TDMA SYSTEM

(75) Inventors: Osmo Schroderus, Sumiainen (FI); Kimmo Kinnunen, Äänekoski (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/463,295

(22) PCT Filed: May 24, 1999

(86) PCT No.: PCT/FI99/00444
§ 371 (c)(1), (2), (4) Date: Jan. 24, 2000

(87) PCT Pub. No.: WO99/62283
PCT Pub. Date: Dec. 2, 1999

(30) Foreign Application Priority Data

May 25, 1998 (FI) ................................................. 981153

(51) Int. Cl.⁷ .............................................. H04B 7/212
(52) U.S. Cl. ........................ 370/347; 370/337; 370/442
(58) Field of Search ................................. 370/347, 321, 370/322, 324, 326, 329, 337, 341, 348, 350, 442, 443, 503, 312, 313, 314, 328, 330, 344, 345, 432, 436, 437, 458, 459, 461, 462; 455/450, 452, 464

(56) References Cited

U.S. PATENT DOCUMENTS

| | | | |
|---|---|---|---|
| 5,235,598 A | | 8/1993 | Sasuta |
| 5,583,870 A | * | 12/1996 | Delprat et al. ............... 370/337 |
| 5,748,624 A | * | 5/1998 | Kondo ........................ 370/347 |
| 5,774,790 A | * | 6/1998 | Dupuy ........................ 370/337 |
| 5,940,763 A | * | 8/1999 | Aperovich et al. ......... 455/450 |
| 5,946,306 A | * | 8/1999 | Talarmo ..................... 370/337 |
| 6,101,383 A | * | 8/2000 | Poon ........................... 455/425 |

FOREIGN PATENT DOCUMENTS

| | | |
|---|---|---|
| EP | 886 453 | 12/1998 |
| GB | 2 322 043 | 12/1998 |
| WO | 94/28643 | 12/1994 |
| WO | 99/17470 | 4/1999 |

* cited by examiner

*Primary Examiner*—Douglas Olms
*Assistant Examiner*—Phirin Sam
(74) *Attorney, Agent, or Firm*—Pillsbury Winthrop LLP

(57) ABSTRACT

A method for using channels in a time-division multiple access radio system which includes at least one base station and at least one mobile station and which operates on one or more carrier frequencies per base station. The carrier frequencies are divided into a plurality of physical channels including time slots and a predetermined number of time slots forming a frame. One of the base station's carriers is a main carrier on which a main control channel operates. At least one physical channel of the main carrier is used for transmitting broadcast control channels and the last one of said at least one physical channel is allocated to a traffic channel only if the base station does not have other physical channels available.

32 Claims, 2 Drawing Sheets

METHOD FOR CHANNEL USE IN TDMA SYSTEM, AND TDMA SYSTEM

This application is the national phase of international application PCT/FI99/00444 filed May 24, 1999 which designated the U.S.

BACKGROUND OF THE INVENTION

The invention relates to a method for using channels in a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates.

In a time-division multiple access (TDMA) data transmission, one carrier frequency is used to provide a plural number of physical channels by dividing the data transmission taking place on the carrier into time slots and by always allocating regularly recurring time slots to a particular physical channel. Physical channels can be further used to form logical channels by reserving data transmission capacity from the physical channels to a logical channel.

For example, in a system conforming to the TETRA (Terrestrial Trunked Radio) standard where channels are formed by applying the TDMA method, one time slot comprises 510 bits. Four time slots form a frame, 18 frames form a multiframe and 60 multiframes form a hyperframe. In the TETRA system the logical channels to be used can be divided into two main categories: control channels (CCH), used for transmitting various control data, for example, and traffic channels (TCH), used for transmitting speech data, for example.

In the TETRA system a base station can use one or more carriers divided into physical channels as described above. One of the carriers is a main carrier comprising a Main Control Channel (MCCH) and possibly Secondary Control Channels (SCCH), if any are used. The MCCH is usually transmitted in the first time slot of a main carrier frame. At a small base station of a single carrier it is possible that also the first time slot of a frame is occasionally allocated to traffic channels. The MCCH is then only transmitted in frame 18 (control frame) of the multiframe, frame 18 being reserved exclusively for the transmission of control data. SCCH channels, if any, are sent in time slots 2, 3 and 4 (max. three) of the main carrier frame. To be able to operate on the main control channel of the base station, the mobile station must first receive a Sync-PDU (Protocol Data Unit) from a Broadcast Synchronisation Channel (BSCH). The Sync-PDU comprises the data of the colour code used by a base station cell, the code allowing the mobile station to decode the contents of other time slots. With the exception of the BSCH, the contents of the channels are coded by mean's of a colour code. The Sync-PDU also comprises detailed information about the timing of the time slot, frame and multiframe used by the base station cell. After having received the Sync-PDU, the mobile station receives a Sysinfo-PDU from a Broadcast Network Channel (BNCH). The Sysinfo-PDU comprises, for example, information about whether the mobile station can operate in the cell concerned, and necessary values of parameters relating to the use of the cell. The BSCH and the BNCH are Broadcast Control Channels (BCCH), the channels broadcasting from one base station to all mobile stations within the area of the base station. After having received both the Sync-PDU and the Sysinfo-PDU, the mobile station is synchronized to the base station cell andi can potentially start to operate on its main control channel MCCH.

A problem with the above described arrangement is that if all the physical channels available on the main carrier have been allocated to traffic channels, the base station can transmit the BSCH and BNCH channels only once during one multiframe, in frame 18 (control frame) of the multiframe. The transmission time of a multiframe being about one second, this delays the synchronization of mobile stations to a base station cell since the mobile station is able to receive a BSCH only about once a second and a BNCH after a second from the BSCH. The synchronization can therefore take even two seconds, which is a long time, particularly if the mobile station must check several main carrier alternatives when evaluating their suitability for its operation.

BRIEF DESCRIPTION OF THE INVENTION

An object of the invention is therefore to provide a method allowing the above problems to be solved. The objects of the invention are achieved with a method characterized in that at least one physical channel of a main carrier is used for transmitting broadcast control channels (BCCH), and the last one of said at least one physical channel is allocated to a traffic channel (TCH) only if other physical channels are not available at the base station.

The invention is based on the idea that one physical channel is kept available on the main carrier until all other physical channels are reserved, the physical channel on the main carrier being available to the base station for transmitting the BSCH and the BNCH.

An advantage of the method of the invention is that it accelerates the synchronization of the mobile station to the base station by allowing, at its best, the BSCH and the BNCH to be transmitted once during every frame, i.e. at intervals of about 60 ms.

The invention further relates to a method for using channels in a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates, the method being characterized in that at least one physical channel of the main carrier is used for transmitting broadcast control channels (BCCH) and the last one of said at least one physical channel is allocated to a traffic channel (TCH) only if other carriers of the base station, which have at least one reserved physical channel, do not have any physical channels available.

The method allows the synchronization of a mobile station to a base station to be accelerated if unallocated physical channels are available, provided, however, that the number of carriers in active use is not increased, i.e. the aim is to have a minimum number of carriers in use.

The invention further relates to a method for using channels in a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates, the method being characterized in that at least one physical channel of the main carrier not allocated for other use is used for transmitting broadcast control channels (BCCH), and channels are allocated base-station-specifically either by applying a first principle of allocation which primarily supports the minimizing of the synchronization delay of a mobile station to a base station, or a second principle of allocation which primarily supports the minimizing of the number of carriers in use at a base station.

The invention is based on that the system has two different channel allocation principles which it can apply. According to both allocation principles, a physical channel available on the main carrier is used for transmitting broadcast control channels, if possible. The different allocation principles allow a base-station-specific decision to be made on what is to be primarily emphasized: the minimizing of the synchronization delay or the minimizing of the number of carriers in use.

An advantage of the invention is that by selecting the desired channel allocation principle the system can be easily optimized to suit different circumstances and, in addition, the system accelerates the synchronization of a mobile station to a base station whenever the main carrier has a physical channel available that can be used for transmitting broadcast control channels.

The invention further relates to a a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates, the system being characterized in that the system is arranged to use at least one physical channel of the main carrier for transmitting broadcast control channels (BCCH) and to allocate the last one of said at least one physical channel to a traffic channel (TCH) only if other physical channels are not available at the base station.

The invention further relates to a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates, the system being characterized in that the system is arranged to use at least one physical channel of the main carrier for transmitting broadcast control channels (BCCH) and to allocate the last one of said at least, one physical channel to a traffic channel (TCH) only if the other carriers of the base station that have at least one reserved physical channel, do not have any physical channels available.

The invention further relates to a time-division multiple access (TDMA) radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel (MCCH) operates, the system being characterized in that the system is arranged to use at each base station at least one physical channel of the main carrier not allocated for other use for transmitting broadcast control channels (BCCH), each base station having two alternative channel allocation principles to choose from; the first alternative allocation principle primarily supporting the minimizing of the synchronization delay of the mobile station to the base station and the second alternative allocation principle primarily supporting the minimizing of the number of carriers in use at the base station.

The above described radio systems allow the advantages of the methods of the invention to be easily gained.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Although in the following the invention will be described with reference to a TETRA system, the aim is not to restrict the invention to any particular system.

Figure 1:
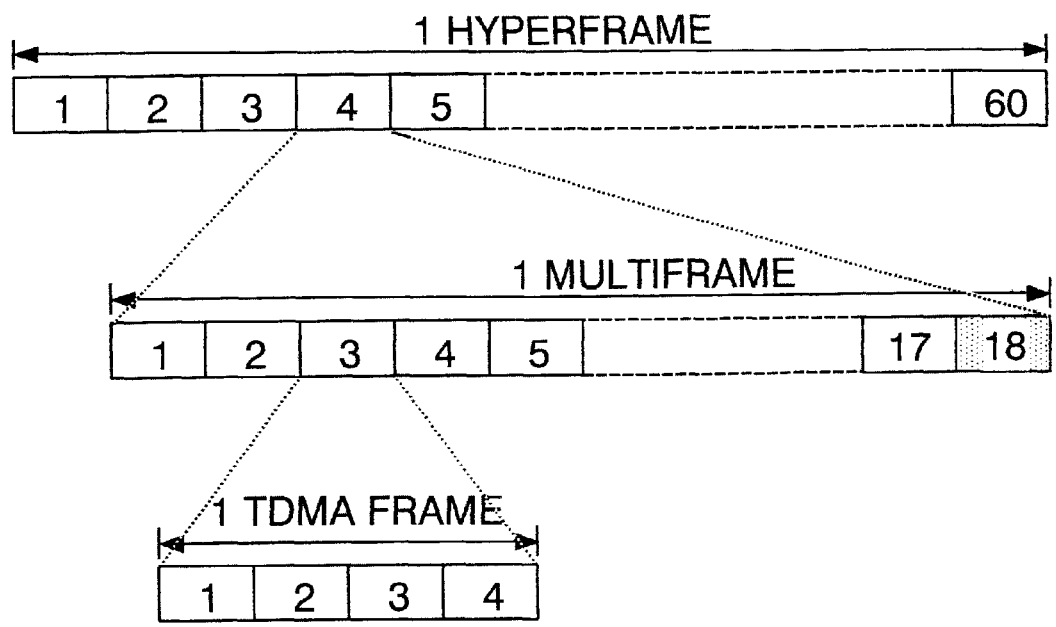
FIG. 1 illustrates a frame structure in the TETRA system.

FIG. 1 shows a frame structure of a system conforming to the TETRA standard where channels are formed by applying the TDMA method. One frame comprises four time slots of 510 bits, 18 frames form a multiframe and 60 multiframes form a hyperframe. Frame 18 of the multiframe is a control frame reserved exclusively for the transmission of control data. The duration of one frame is about 60 ms, the durations of a multiframe and a hyperframe being about 1 s and 60 s, respectively.

Figure 2:
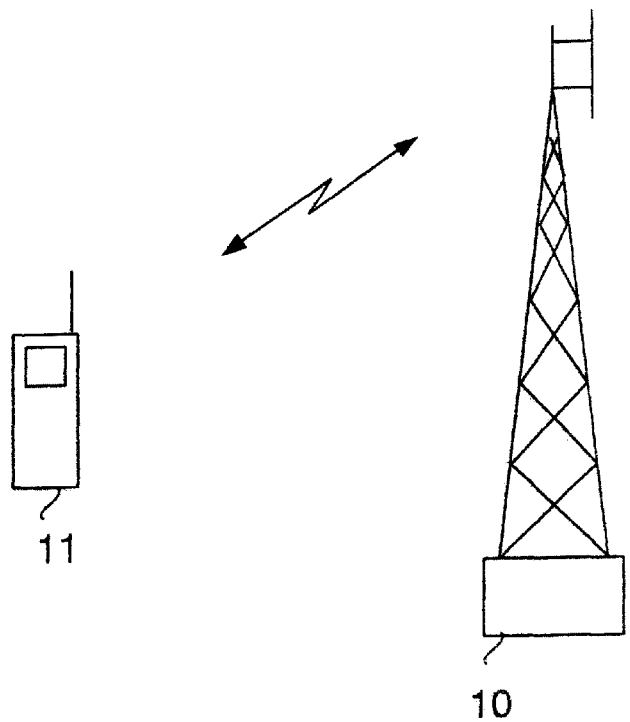
FIG. 2 illustrates an example of a radio system of the invention.

FIG. 2 is a diagram illustrating an example of a radio system of the invention. The Figure shows a base station 10 and a mobile station 11 communicating with the base station.

Figure 3:
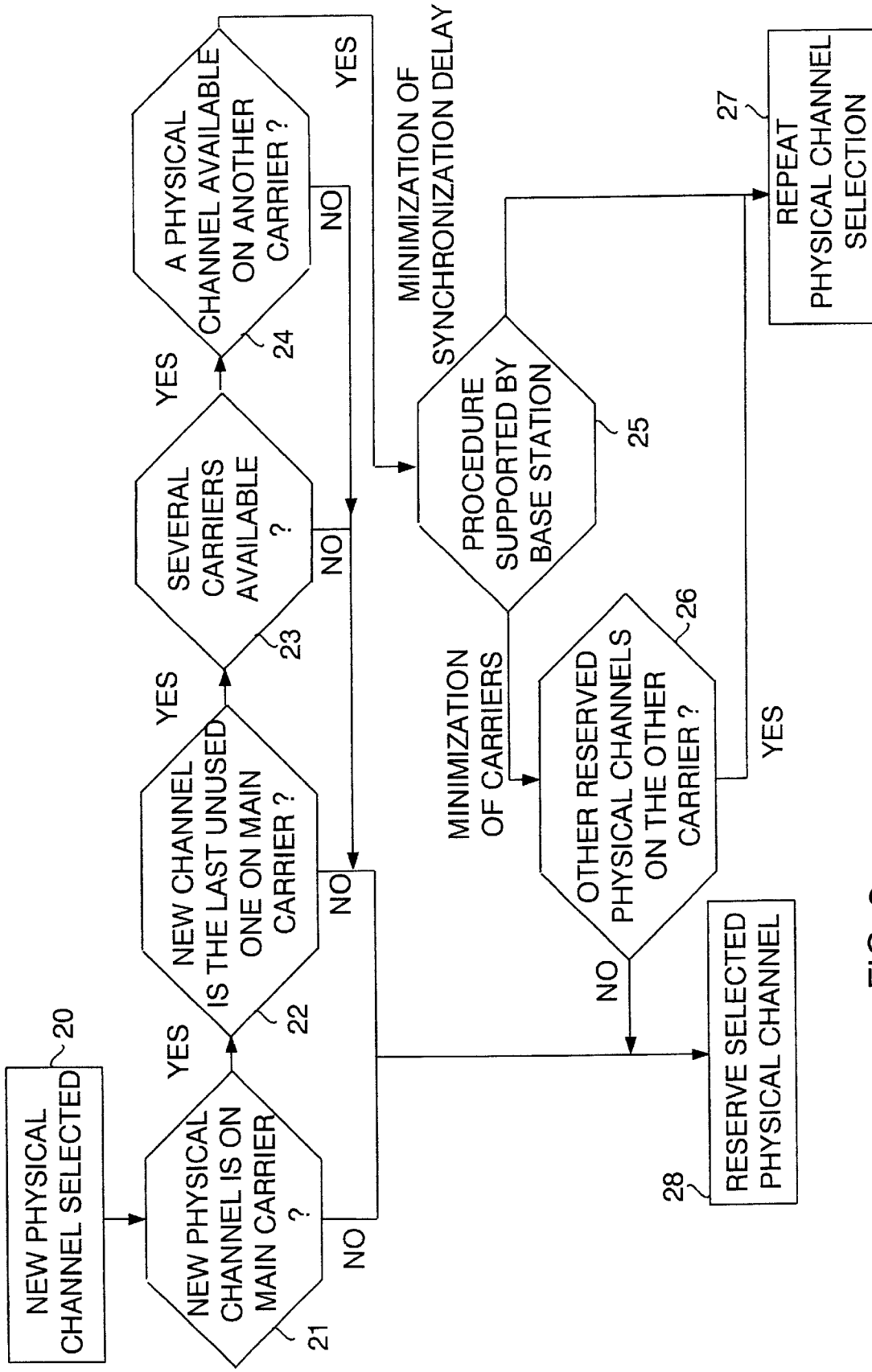
FIG. 3 is a flow chart illustrating an example of an embodiment of a method of the invention.

FIG. 3 is a flow chart illustrating an example of an embodiment of the method of the invention. In step 20 is selected a new physical channel that is to be allocated for traffic. In step 21 is first checked whether the selected physical channel is located on a main carrier or on another carrier. If the selected physical channel is not on the main carrier and, therefore, not significant to the method of the invention, the routine proceeds directly to step 28 where the selected physical channel is reserved. If the selected physical channel is located on the main carrier, it is checked in step 22 whether the selected physical channel is the last unused physical channel of the main carrier. If the selected physical channel is not the last unused channel of the main carrier, the routine proceeds to step 28 where the selected physical channel is reserved. If the selected physical channel is the last unused physical channel of the main carrier, it is checked in step 23 whether other carriers besides the main carrier are available. If other carriers are not available, the routine proceeds to step 28 where the selected physical channel is reserved. If other carriers besides the main carrier are available, it is checked in step 24 whether any other carrier of the ones that are available has a physical channel available. If none of the other carriers available has a physical channel available, the routine proceeds to step 28 where the selected physical channel is reserved. If an available physical channel is found on one of the other carriers available, a situation arises where the last physical channel available on the main carrier has been selected, but there is also a physical channel available on another carrier. The routine then proceeds in step 25 according to one of the following alternative procedures: in the first procedure the base station 10 aims at minimizing the synchronization delay of the mobile stations 11. The routine therefore proceeds to step 27 to repeat the physical channel selection, i.e. another available physical channel is selected than the already selected last physical channel available on the main carrier. In the second procedure the base station 10 aims primarily at minimizing the number of carriers in use. The routine therefore proceeds to step 26 to check whether the other carrier that has a physical channel available, has other physical channels that are reserved. If the other carrier already has a reserved physical channel, i.e. the carrier is already in use, the routine proceeds to step 27 to repeat the physical channel selection, i.e. another available physical channel is selected than the already selected last physical channel available on the main carrier. If the other carrier does not have reserved physical channels, the new carrier is not taken in use, but the physical channel originally selected is reserved in step 28.

Further, according to the basic idea of the invention, if another physical channel than the last unallocated physical channel on the main carrier can be selected for traffic in accordance with the above described algorithm, thereby leaving at least one unallocated physical channel on the main carrier, the unallocated physical channel on the main carrier will be used for transmitting BSCH and BNCH channels from the base station to the mobile stations. In an ideal situation the BSCH+BNCH can be transmitted in every frame of the main carrier, thereby allowing the mobile stations 11 to read them at intervals of about 60 ms. This significantly accelerates the synchronization of the mobile stations 11 to the base station 10 compared with a situation where the BSCH+BNCH is transmitted only once during a multiframe in a control frame, i.e. at intervals of about 1 s.

It is apparent to a person skilled in the art that as technology advances, the basic idea of the invention can, be implemented in various ways. The invention and its embodiments are therefore not restricted to the above described examples but they may vary within the scope of the claims.

What is claimed is:

1. A method for using channels in a time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, the method comprising using at least one physical channel of the main carrier for transmitting broadcast control channels; and allocating the last one of said at least one physical channel, which is used for transmitting the broadcast control channels, to a traffic channel only if other physical channels are not available at the base station.

2. A method according to claim 1, wherein a frame comprises four time slots, 18 frames for a multiframe and 60 frames form a hyperframe.

3. A method according to claim 2, wherein a frame of the multiframe is a control frame exclusively reserved for the use of control channels.

4. A method according to claim 3, wherein the main control channel (MCCH) is transmitted at least in the control frame of the main carrier, and it can also be transmitted in the first time slot of every frame of the main carrier.

5. A method according to claim 1, wherein one of the broadcast control channels to be transmitted on the physical channel available on the main carrier is a broadcast synchronization channel.

6. A method according to claim 1, wherein one of the broadcast channels to be transmitted on the physical channel available on the main carrier is a broadcast network channel.

7. A method for using channels in a time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, the method comprising using at least one physical channel of the main carrier for transmitting broadcast control channels; and allocating the last one of said at least one physical channel, which is used for transmitting the broadcast control channels, to a traffic channel only if other carriers of the base station that have at least one reserved physical channel do not have any physical channels available.

8. A method according to claim 7 wherein a frame comprises four time slots, 18 frames form a multiframe and 60 frames form a hyperframe.

9. A method according to claim 7, wherein one of the broadcast control channels to be transmitted on the physical channel available on the main carrier is a broadcast synchronization channel.

10. A method according to claim 7, wherein one of the broadcast control channels to be transmitted on the physical channel available on the main carrier is a broadcast network channel.

11. A method for using channels in a time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, the method comprising using at least one physical channel of the main carrier that is not allocated for other use for transmitting broadcast control channels;

allocating channels base-station-specifically by applying either a first allocation principle, which primarily supports the minimizing of the synchronization delay of the mobile station to the base station, or a second allocation principle, which primarily supports the minimizing of the number of carriers in use at the base station.

12. A method according to claim 11, wherein according to said first allocation principle, the last one of said at least one physical channel, which is used for transmitting the broadcast control channels, is allocated to a traffic channel only if other physical channels are not available at the base station.

13. A method according to claim 11, wherein according to said second allocation principle, the last one of said at least one physical channel, which is used for transmitting the broadcast control channels, is allocated to a traffic channel only if other carriers of the base station that have at least one reserved channel do not have any physical channels available.

14. A method according to claim 11 wherein a frame comprises four time slots, 18 frames form a multiframe and 60 frames form a hyperframe.

15. A method according to claim 11, wherein one of the broadcast control channels to be transmitted on the physical channel available on the main carrier is a broadcast synchronization channel.

16. A method according to claim 11, wherein one of the broadcast control channels to be transmitted on the physical channel available on the main carrier is a broadcast network channel.

17. A time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, wherein the system comprises means for using at least one physical channel of the main carrier for transmitting broadcast control channels; and means for allocating the last one of said at least one physical channel, which is used for transmitting the broadcast control channels, to a traffic channel only if other physical channels are not available at the base station.

18. A system according to claim 17, wherein a frame comprises four time slots, 18 frames form a multiframe and 60 frames form a hyperframe.

19. A system according to claim 18, wherein a frame of the multiframe is a control frame exclusively reserved for control channels.

20. A system according to claim 19, wherein the main control channel is transmitted at least in the control frame of the main carrier, and it can also be transmitted in the first time slot of every main carrier frame.

21. A system according to claim 17, wherein one of the broadcast channel to be transmitted on an available physical channel of the main carrier is a broadcast synchronization channel.

22. A system according to claim 17, wherein one of the broadcast control channel to be transmitted on an available physical channel of the main carrier is a broadcast network channel.

23. A time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, wherein the system comprises means for using at least one physical channel of the main carrier for transmitting broadcast control channels; and means for allocating the last one of said at least one physical channel, which is used for transmitting the broadcast control channels, to a traffic channel only if the other carriers of the base station that have at least one reserved physical channel, do not have any physical channels available.

24. A system according to claim 23, wherein a frame comprises four time slots, 18 frames form a multiframe and 60 frames form a hyperframe.

25. A system according to claim 23, wherein one of the broadcast control channel to be transmitted on an available physical channel of the main carrier is a broadcast synchronization channel.

26. A system according to claim 23, wherein one of the broadcast control channel to be transmitted on an available physical channel of the main carrier is a broadcast network channel.

27. A time-division multiple access radio system which comprises at least one base station and at least one mobile station and which operates on one or more carrier frequencies per base station, the carrier frequencies being divided into a plural number of physical channels comprising time slots, a predetermined number of time slots forming a frame, and in which system one of the base station's carriers is a main carrier on which a main control channel operates, wherein each base station is controlled to use at least one physical channel of the main carrier that is not allocated for other use for transmitting broadcast control channels; and that each base station has means for selecting from either one of two alternative channel allocation principles, the first alternative allocation principle primarily supporting the minimizing of the synchronization delay of the mobile station to the base station and the second alternative allocation principle primarily supporting the minimizing of the number of carriers in use at the base station.

28. A system according to claim 27, wherein according to said first allocation principle, the system is arranged to allocate the last one of said at least one physical channel, which is used for transmitting the broadcast control channels, to a traffic channel only if other physical channels are not available at the base station.

29. A system according to claim 27, wherein according to said second allocation principle, the system is arranged to allocate the last one of said at least one physical channel, which is used for transmitting the broadcast control channels, to a traffic channel only if the other carriers of the base station that have at least one reserved physical channel, do not have any physical channels available.

30. A system according to claim 27, wherein a frame comprises four time slots, 18 frames form a multiframe and 60 frames form a hyperframe.

31. A system according to claim 27, wherein one of the broadcast control channel to be transmitted on an available physical channel of the main carrier is a broadcast synchronization channel.

32. A system according to claim 27, wherein one of the broadcast control channel to be transmitted on an available physical channel of the main carrier is a broadcast network channel.

* * * * *